though cupric sulfate is detrimental to fresh flowers in too great concentration. Magnesium sulfate in small amounts appears to be helpful in the extension of the life of the flower.

3,104,968
TREATMENT OF CUT FLOWERS
William L. Fisher, 467 E. 23rd St., Hialeah, Fla.
No Drawing. Filed Mar. 14, 1961, Ser. No. 95,482
1 Claim. (Cl. 71—2.4)

This invention relates to the art of extending the life of cut flowers, and particularly relates to a chemical preparation capable of extending the life of cut flowers, such as roses, chrysanthemums, carnations, gladioli, lilies, gardenias, orchids, poinsettias, etc.

One object of this invention is to provide a water soluble chemical preparation that prolongs the fresh appearance of cut flowers, especially those that are in demand for ceremonial occasions and that tend to wilt and die within a few days.

Another object of this invention is to furnish a flower preparation that is relatively inexpensive.

A further object of the invention is to maintain the adherence of the petals to the stem while still retaining the natural color of the flower and keeping the petals in a soft but firm condition.

Other objects will appear hereinafter.

In the preferred embodiment of my invention the freshly cut flowers are placed by their stems in a water solution of a mixture of a manganous salt, such as manganese sulfate and of a sugar such as sucrose or dextrose. Surprisingly in such a solution the petals of the flowers retain their fresh appearance for a period of several days longer than when placed in water alone. Best results are accomplished when small amounts of ammonium sulfate, aluminum ammonium sulfate, copper sulfate, and magnesium sulfate are also present in the solution.

The following examples illustrate certain specific applications of the invention, it being understood, of course, that they are not to be construed as being restrictive of the scope of the invention.

Example 1

A batch of previously cut pinkish red roses, having the same pretreatment history, were cut fresh at the stems and several were put in tap water as a control and several were placed in a water solution containing by volume 0.30% manganese sulfate and 1.5% sucrose. At room temperature, the petals of the rosebuds in the chemical solution unfurled more slowly than those in the water and retained their bud center longer. The feel of the flower petals also remained soft but firm over a longer period than those in the water control solution.

Example 2

A special aqueous solution was prepared containing 0.05% manganous sulfate, 0.05% aluminum ammonium sulfate, 0.02% ammonium sulfate, 1.5% sucrose, 0.0015% cupric sulfate, and 0.01% magnesium sulfate. The stems of some previously cut commercial roses were cut again and placed in this solution at the same time that the other roses from the same batch were placed by their stems in tap water as a control. All were exposed to the same conditions of room temperature until all the roses had wilted and/or the petals fallen off. The petals of the roses in the control water solution turned to a light purple in 3½ days and were completely wilted after six days. In contrast the petals of the roses in the special solution never turned purple and were completely wilted only after seven days.

Example 3

An aqueous solution was prepared containing 0.20% manganous sulfate, 0.05% ammonium sulfate, 2.5% sucrose, 0.0015% cupric sulfate and 0.01% magnesium sulfate. The stems of a batch of cut roses from a commercial source were cut again and some of the roses were placed in tap water as control and some were put in the prepared aqueous solution, and both lots were kept under the same conditions, such as room temperature. The roses in the control were discarded at the end of four days as the petals had wilted and/or fallen off. The roses in the aqueous chemical solution exhibited a partially budded appearance longer than the control and wilted only after six days.

Example 4

The stems of a batch of cut chrysanthemums from a commercial source were cut again and some of the chrysanthemums were placed in a vase containing tap water. The remainder of the chrysanthemums were put by their stems into a water solution containing 0.15% manganous sulfate, 0.02% ammonium sulfate, 0.5% sucrose, 0.0015% cupric sulfate, 0.01% magnesium sulfate, and 0.025% aluminum ammonium sulfate. At room temperature, the chrysanthemums in the water solution of chemicals outlived the chrysanthemums in the tap water by two days.

Example 5

The stems of a batch of cut orchids from a commercial source were cut again and placed in a vase containing an aqueous chemical solution containing 0.075% manganous sulfate, 0.012% aluminum ammonium sulfate, 0.01% ammonium sulfate, 0.25% sucrose, 0.0007% cupric sulfate, and 0.005% magnesium sulfate. At room temperature the normally short lived orchids remained fresh and beautiful for an unusually long time, it being only necessary to discard them after 11 days.

Example 6

The stems of a batch of poinsettias were cut again and the poinsettias placed in a vase containing an aqueous chemical solution containing 0.30% manganous sulfate, 0.04% ammonium sulfate, 1.0% sucrose, 0.003% cupric sulfate, 0.02% magnesium sulfate, and 0.05% aluminum ammonium sulfate. At ordinary room temperature, the poinsettias kept fresh in appearance over an extended period finally being discarded after ten days.

In the preferred form of my invention, the freshly cut flowers are placed in the chemical solutions at room temperature for about thirty minutes and then kept at about 48° F. in a refrigerator for at least two hours. When the cut flowers thus pretreated are kept in the chemical solution and exposed to ordinary room temperature they retain their fresh appearance for at least five days, and sometimes as much as ten days longer than the same flowers in tap water without the benefit of the pretreatment and chemical solution.

While manganous sulfate and sucrose alone are capable of extending the life of cut flowers, I prefer for best results to have also present small amounts of ammonium sulfate, of ammonium aluminum sulfate, and of a fungicide such as cupric sulfate. I also prefer to use the chemicals within an optimum range for best results. Thus if too much manganese salt is added, the rose petals acquire a purple color, while if too little is used the rose petals droop and fall off without extension of the life of the flower. A range of about 0.05% to 0.25% manganous sulfate seems to produce best results. It is best to add sucrose in a range of about 0.05% to 3%, the upper limits being employed with upper limit amounts of manganous sulfate. A concentration of 0.01% to about 0.05% seems to be optimum for ammonium sulfate. In the case of aluminum ammonium sulfate, a range of about 0.01% to 0.05% seems most effective. The addition of about 0.005% to 0.02% of magnesium sulfate is beneficial. Copper sulfate in the amount of about 0.0015% inhibited the growth of any mold or fungi in the solution without any apparent detrimental effect on the flowers.

Other manganous salts such as manganese carbonate can replace the manganese sulfate in whole or in part. Other ammonium salts, such as ammonium chloride, ammonium phosphate, and ammonium carbonate can be substituted in whole or in part for the ammonium sulfate. Other sugars, such as dextrose can replace part or all of the sucrose. In place of magnesium sulfate, other water soluble magnesium salts such as magnesium chloride, magnesium nitrate, and magnesium phosphate. Likewise other water soluble fungicides can be substituted for copper sulfate, such as other copper salts or quaternary ammonium salts like trimethyl benzyl ammonium chloride. Various modifications of my invention can be made without departure from the spirit of my invention, and the invention is therefore not restricted to the above details except as set forth in the appended claim.

I claim:

A process for extending the life of cut flowers comprising placing the stems of freshly cut flowers into a special water solution at room temperature for about 30 minutes and then at about 48° F. for at least two hours, said special water solution consisting of .05 to .25% of manganous sulfate, .01 to .05% of ammonium sulfate, .01 to .05% ammonium aluminum sulfate, .05 to 3% of sucrose, .0015% copper sulfate, and water.

References Cited in the file of this patent

UNITED STATES PATENTS

| | | |
|---|---|---|
| 1,956,908 | Neuhert | May 1, 1934 |
| 2,230,931 | Bussert | Feb. 4, 1941 |
| 2,317,631 | Meyer | Apr. 27, 1943 |
| 2,614,039 | Hammer | Oct. 14, 1952 |
| 2,805,137 | Clopton | Sept. 3, 1957 |
| 2,971,292 | Malecki | Feb. 14, 1961 |
| 3,000,722 | Lunnolt | Sept. 19, 1961 |

OTHER REFERENCES

American Journal of Botany, "Effect of Chemicals . . . of Cut Flowers," Hitchcock et al., vol. 16, 1929, pages 433–440. (Copy in 71–Cut Flowers Digest.)